United States Patent
Hu et al.

(10) Patent No.: US 9,693,238 B2
(45) Date of Patent: Jun. 27, 2017

(54) DYNAMIC ANTENNA TUNING FOR MULTI-BAND MULTI-CARRIER WIRELESS SYSTEMS

(71) Applicant: Apple Inc., Cupertino, CA (US)

(72) Inventors: Ming Hu, Sunnyvale, CA (US); Haining Zhang, San Jose, CA (US); Christian W. Mucke, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 183 days.

(21) Appl. No.: 14/257,915

(22) Filed: Apr. 21, 2014

(65) Prior Publication Data

US 2015/0305035 A1  Oct. 22, 2015

(51) Int. Cl.
  *H04W 24/02* (2009.01)
  *H04B 1/04* (2006.01)
  *H04B 1/18* (2006.01)

(52) U.S. Cl.
  CPC .......... *H04W 24/02* (2013.01); *H04B 1/0458* (2013.01); *H04B 1/18* (2013.01)

(58) Field of Classification Search
  None
  See application file for complete search history.

(56) References Cited

U.S. PATENT DOCUMENTS

| | | | |
|---|---|---|---|
| 7,460,834 B2 | 12/2008 | Johnson et al. | |
| 7,911,402 B2* | 3/2011 | Rowson | H01Q 1/243 343/700 MS |
| 8,412,126 B2 | 4/2013 | Karabinis et al. | |
| 2006/0183431 A1 | 8/2006 | Chang et al. | |

(Continued)

FOREIGN PATENT DOCUMENTS

| | | |
|---|---|---|
| CN | 105024726 A | 11/2015 |
| DE | 102015206642 A1 | 10/2015 |

(Continued)

OTHER PUBLICATIONS

Japanese Application for Invention No. 2015084489—Office Action dated Apr. 1, 2016.

(Continued)

*Primary Examiner* — David Bilodeau
(74) *Attorney, Agent, or Firm* — Downey Brand LLP (57) ABSTRACT

Apparatus and methods for the design and dynamic tuning of antenna circuitry for use across multiple radio frequency bands in wireless communication devices is disclosed herein. An antenna apparatus includes antenna tuning control, antenna tuning circuitry, and a set of one or more physical antennas. The antenna tuning controller includes a combination of baseband and front-end hardware and software. The antenna circuitry collectively includes antenna tuning circuitry and the set of one or more physical antennas. Based on a set of radio frequency bands and on communication channel conditions, the antenna tuning controller determines an optimal antenna tuning configuration and provides appropriate parameters to the antenna tuning circuitry. The antenna apparatus configures and optimizes the tuning of the antenna circuitry for a future time period, which can be a next time slot. The antenna tuning controller utilizes a cost/gain function to calculate the optimal antenna tuning configuration.

20 Claims, 6 Drawing Sheets

(56) References Cited

U.S. PATENT DOCUMENTS

| | | | |
|---|---|---|---|
| 2009/0121963 A1* | 5/2009 | Greene | H03H 7/40 343/861 |
| 2010/0157858 A1 | 6/2010 | Lee et al. | |
| 2013/0120200 A1 | 5/2013 | Desclos et al. | |
| 2013/0265890 A1 | 10/2013 | Ali et al. | |
| 2014/0038585 A1 | 2/2014 | Xin et al. | |

FOREIGN PATENT DOCUMENTS

| | | |
|---|---|---|
| JP | 2008530957 A | 8/2008 |
| WO | 2006089018 A1 | 8/2006 |
| WO | 2013052277 A2 | 4/2013 |

OTHER PUBLICATIONS

Chinese Application for Invention No. 201510185482.7—Office Action dated Mar. 9, 2017.

\* cited by examiner

DYNAMIC ANTENNA TUNING FOR MULTI-BAND MULTI-CARRIER WIRELESS SYSTEMS

FIELD

The described embodiments generally relate to wireless communications, and more particularly, to procedures for dynamically tuning antenna settings for multi-band multi-carrier systems.

BACKGROUND

In mobile communications, a multi-band wireless device can refer to a mobile phone (or other wireless communication equipment) that supports multiple radio frequency (RF) bands. Each RF band spans a range of radio frequencies and contains multiple radio frequency channels. Some multi-band mobile wireless devices may use a single carrier frequency for communication, whereas other multi-band mobile wireless devices may support multi-carrier communication using multiple frequency channels simultaneously. Support for multiple radio frequency bands in multi-band wireless devices provide for roaming between different regions of the world, where different wireless communication protocols can be used to provide mobile wireless services. For widely separated radio frequency bands, parallel transmit and receive signal path circuits may be required, which can increase the cost, physical size, complexity and power demand of multi-band wireless devices. Multi-band wireless communications can directly impact antenna design for the multi-band wireless devices that support such communication.

Fundamental elements of a radio system include a receiver, a transmitter, which in combination with the receiver can be referred to as a transceiver, and one or more antennas to radiate and receive radio waves. Characteristics of the antennas can be based on specifications for the receiver and the transmitter, for example a bandwidth and a carrier frequency. In some embodiments, the receiver and the transmitter can operate at the same carrier frequency such that an antenna in the wireless device may only require tuning to a single carrier frequency.

First generation (1G) mobile systems utilized a single carrier frequency for operation, e.g. in North American, the Advanced Mobile Phone System (AMPS) system used a carrier at 800 MHz. With the evolution to second generation (2G) standards, mobile systems (TDMA, GSM, CDMA) introduced dual radio frequency bands. Dual band mobile devices operate using two radio frequency bands. Thus, 2G mobile wireless devices, e.g., user equipment (UE) and network equipment such as a base transceiver station (BTS) can require a dual-band antenna apparatus for operation. A dual-band antenna apparatus for a mobile wireless device can be implemented using two separate antennas or can be implemented by combining multiple elements to create an antenna that operates in two separate radio frequency bands.

With the evolution of wireless communication standards, e.g. from 2G mobile systems to third generation (3G) mobile systems, and with the demand to provide wireless communication devices that can connect to wireless services worldwide, the complexity of antenna designs continue to increase. Multi-band mobile wireless devices have evolved from dual-band to tri-band to quad-band capabilities. For example, a quad-band wireless device can support four separate radio frequency bands, e.g., 850 and 1900 MHz radio frequency bands, typically used in the Americas (ITU region 2), and 900 and 1800 MHz radio frequency bands typically used in Europe and other regions. Some wireless communication devices that support 2G and 3G wireless communication protocols support all four radio frequency bands.

The evolution to LTE/4G (Long Term Evolution/$4^{th}$ Generation) wireless communication protocols requires mobile wireless devices to support many radio frequency bands. Additionally, for advanced capability wireless communications, there is an increasing demand for wireless systems to use multiple carrier frequencies simultaneously. This demand impacts both mobile wireless devices, e.g., UE's, and access network equipment, e.g., BTS's. Recent advances in wireless communication protocols (e.g., LTE-Advanced protocols) provide for carrier aggregation (CA) that can support simultaneous communication using up to five distinct radio frequency carriers to achieve wider bandwidth and higher throughput. In addition, Dual subscriber identity module (SIM) Dual Standby (DSDS) and/or Dual SIM Dual Access (DSDA) wireless communication devices can require transmission and/or reception using at least two frequency channels in parallel. The requirements of these applications can impose a significant challenge to the design of antennas for wireless communication devices, especially antenna tuning design. Therefore, there is a need for antennas that can operate in a multi-band multi-carrier environment and provide optimal performance across multiple radio frequency bands, while also meeting particular form factor and/or cost objectives.

SUMMARY

A significant challenge in multi-band multi-carrier wireless systems is the design of its antenna circuitry. The antenna circuitry needs to be appropriately tuned for use across multiple radio frequency bands. An apparatus for addressing this challenge is the design of a dynamically tunable antenna apparatus for use in user equipment (UE). Such an antenna apparatus can include an antenna tuning controller, antenna tuning circuitry and a set of physical antennas. The antenna tuning controller can include a combination of baseband and front-end hardware and software. The antenna circuitry can collectively include the antenna tuning circuitry and the set of physical antennas. Based on a set of radio frequency bands of interest and on communication channel conditions, the antenna tuning controller determines an optimal antenna tuning configuration and provides appropriate parameters to the antenna tuning circuitry. The antenna apparatus configures and optimizes the tuning of the antenna circuitry for a future time period, which can be a next time slot. The antenna tuning controller utilizes a cost/gain function to calculate the optimal antenna tuning configuration. In antenna technology, the characteristics of an antenna can be determined by a cost function. The cost function associated with a specific antenna of interest is what quantifies an amount of improvement and a metric for optimization of the antenna tuning configuration. By varying parameters of the cost function, the performance of the dynamically tunable antenna can be adjusted; hence the optimal antenna tuning configuration for the antenna circuitry can be determined.

The steps for determining the optimal antenna tuning configuration start with a characterization of multiple antennas. The results of this characterization of the multiple antennas can be referred to as antenna frequency response information and can include a set of antenna frequency responses for each antenna tuning configuration. This antenna frequency response configuration information can be stored in the UE. The UE then can collect the following additional information: 1) a set of active receive carrier frequencies and active transmit carrier frequencies for a future time period; and 2) a set of states that characterize current uplink communication channel conditions and current downlink communication channel conditions. With the antenna tuning configuration information and the additional information collected, the UE can calculate values for the cost/gain function. The cost function/gain can provide a basis for determining the optimal antenna tuning configuration.

Another method for determining an optimal antenna tuning configuration for the UE includes the following steps. The UE measures the signal strength of a set of carrier frequencies of interest. In some embodiments, the set of carrier frequencies of interest include two or more active carrier frequencies for a future time period. In some embodiments, the two or more active carrier frequencies include one or more active transmit carrier frequencies and/or one or more active receive carrier frequencies. Based on the signal strength measurements, the UE determines a carrier frequency with the poorest signal strength. Then, the UE tunes the antenna circuitry to optimize the signal strength of the carrier frequency that has the poorest measured signal strength. With this method, the carrier frequency with the poorest measured signal strength can be significantly improved, and the impact of the antenna tuning on the performance of other carrier frequencies that have stronger measured signal strengths is likely to be small. Therefore, the method can lead to an improvement in overall performance for the UE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Reference will now be made in detail to representative embodiments illustrated in the accompanying drawings. Although the embodiments of this disclosure are described in sufficient detail to enable one having ordinary skill in the art to practice the described implementations, it should be understood that these examples are not to be construed as being overly-limiting or all-inclusive. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Representative examples of dynamically selecting antenna tuner settings in a mobile wireless device based on a combination of antenna tuning configurations, receive and transmit frequencies, and downlink and uplink operating conditions, are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, as well as any other type of electronic computing device having fourth generation (4G) LTE and LTE Advanced (LTE-A) communication capabilities. In various embodiments, these capabilities may allow a respective UE to communicate within various 4G network cells that can employ any type of LTE-based radio access technology (RAT).

Figure 1A:
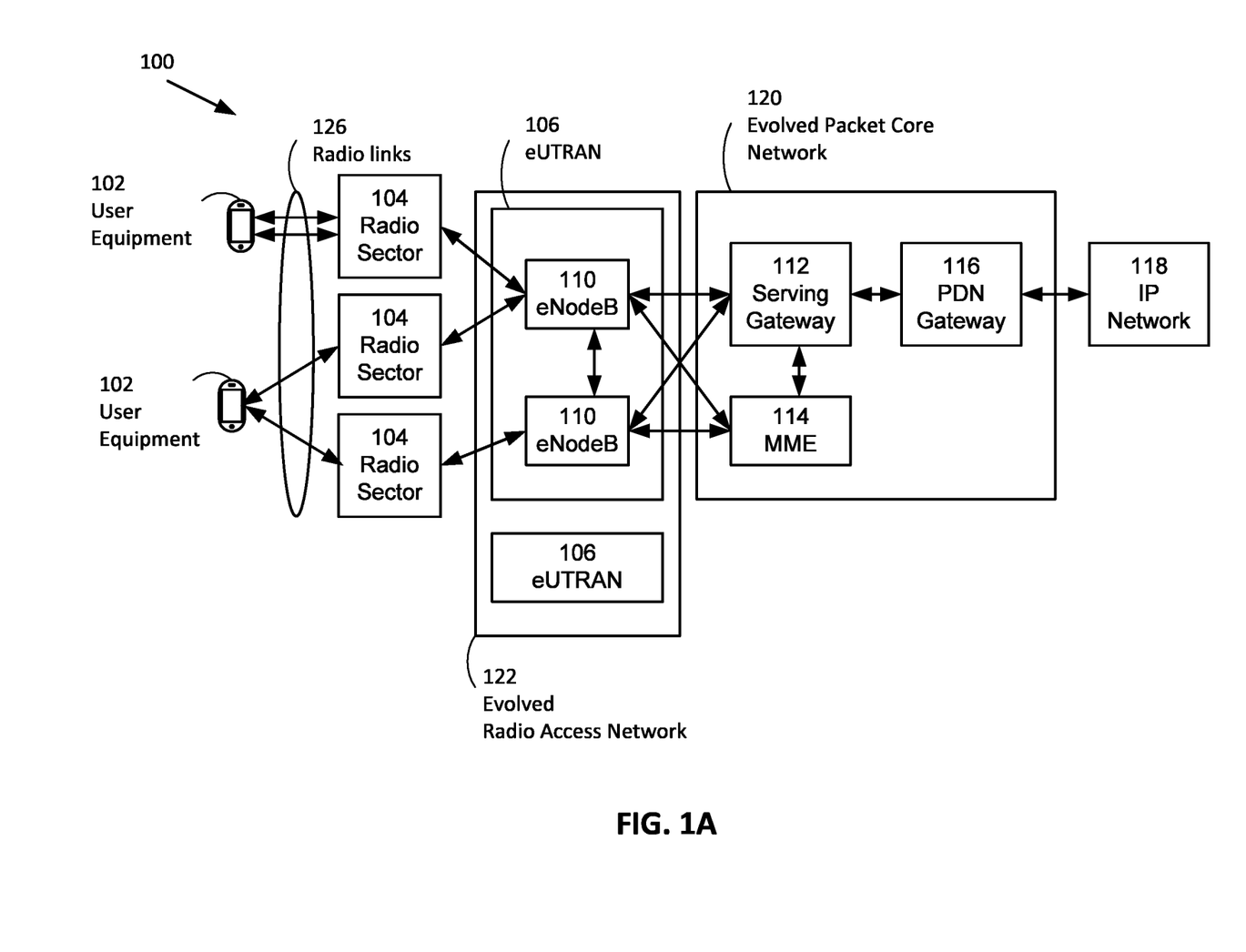
FIG. 1A illustrates a Long Term Evolution (LTE) wireless communication system in accordance with some embodiments.

FIG. 1A illustrates a Long Term Evolution (LTE) wireless communication system in accordance with some embodiments. The specifications for LTE are provided by the 3rd Generation Partnership Project (3GPP). 3GPP unites six telecommunications standard development organizations (ARIB, ATIS, CCSA, ETSI, TTA, TTC), known as "Organizational Partners" and provides their members with a stable environment to produce Reports and Specifications that define 3GPP technologies.

The following disclosure relates to dynamic antenna tuning methods and systems for multi-band multi-carrier wireless systems.

A significant challenge for a multi-band multi-carrier wireless system is the design of its antenna apparatus, including its antenna circuitry. The antenna circuitry needs to be appropriately tuned for use across multiple radio frequency bands. An apparatus for addressing this challenge includes the design of a dynamically tunable antenna apparatus for use in user equipment (UE). As described herein, an antenna apparatus can include an antenna tuning controller, antenna tuning circuitry, and a set of physical antennas. The antenna tuning controller can include a combination baseband and front-end hardware and software. In some embodiments, the antenna tuning controller includes software to determine one or more configurations for the antenna circuitry. The antenna tuning controller can optimize tuning of the antenna tuning circuitry in the multi-band multi-carrier wireless system by determining values of components of the antenna tuning circuitry. The term "antenna circuitry" can refer to a combination of antenna tuning circuitry and the set of one or more physical antennas. Hence, antenna circuitry in user equipment (UE) can refer to the combination of the antenna tuning circuitry and the set of physical antenna(s) located in the UE.

The antenna tuning circuitry can be coupled between a radio frequency integrated circuit (RF IC) and front-end of a transceiver and one or more physical antennas, and the antenna tuning circuitry can include adjustable hardware components. The adjustable hardware components can include adjustable capacitors and adjustable inductors.

Based on a set of radio frequency bands of interest and on communication channel conditions, the antenna tuning controller determines an optimal antenna tuning configuration and provides appropriate parameters to the antenna tuning circuitry. The antenna tuning controller utilizes a cost/gain function to calculate the optimal antenna tuning configuration. In antenna technology, the characteristics of an antenna can be determined by a cost function. The cost function associated with a specific antenna of interest is what quantifies an amount of improvement and a metric for optimization of the antenna tuning configuration. By varying parameters of the cost function, the performance of the dynamically tunable antenna apparatus can be adjusted; hence the optimal antenna tuning configuration for the antenna apparatus can be determined.

The steps for determining the optimal antenna tuning configuration start with a characterization of multiple antennas, for example two or more antennas. The results of this characterization of the multiple antennas can be referred to as antenna frequency response information and can include a set of antenna frequency responses for each antenna tuning configuration. This antenna frequency response configuration information can be stored in the UE. The UE then collects the following additional information: 1) a set of active receive frequencies and transmit frequencies for a future time period; and 2) a set of states that characterize current uplink communication channel conditions and current downlink communication channel conditions. With the antenna tuning configuration information and the additional information collected, the UE can calculate values for the cost/gain function. The cost/gain function can provide the basis for determining the optimal antenna tuning configuration.

Another method for determining the optimal antenna tuning configuration for the UE includes the following steps. The UE measures the signal strength of a set of active carrier frequencies of interest. Based on the measurements, the UE determines a carrier frequency with the poorest signal strength. Then, the UE tunes the antenna circuitry to optimize the signal strength of the carrier frequency that has the poorest measured signal strength. With this method, the carrier frequency with the poorest measured signal strength can be significantly improved, and the impact of the antenna tuning on the performance on other carrier frequencies that have stronger measured signal strengths is likely to be small. Therefore, the method can lead to an overall improvement in performance for the UE.

As previously discussed, the evolution to LTE/4G wireless communication protocols introduced a multi-band requirement for the mobile wireless devices. Additionally, operation of a UE in accordance with LTE/4G wireless communication protocols can require a dynamic adjustment of radio frequency channels and/or radio frequency bands (i.e., groups of radio frequency channels) for each transmission, e.g., at a run time or for a future time period. In some embodiments, the UE adjusts which radio frequency channels/bands are used for a next (imminent) transmission time period. For example, when implementing LTE carrier aggregation there can be a need for the UE to dynamically adjust characteristics of its antenna apparatus while connected to a wireless network. With carrier aggregation, the UE can use multiple radio frequency channels in one or more radio frequency bands.

To support a range of "global" radio frequency bands, an antenna tuner has been introduced into advanced antenna design. The antenna tuning settings can be predetermined in a laboratory environment, and can be stored in a look-up table in storage (e.g., memory) of the UE (and/or associated with the UE) for retrieval and use during operation of the UE. During "run time," which can refer to the UE being powered up and operational, the UE can tune the antenna circuitry based on information retrieved from the look-up table for one or more carrier frequencies of interest. In this way, the UE can cover a broader range of radio frequencies using a partial coverage antenna apparatus that is tuned for the carrier frequency of interest while in use. Such a static single carrier design may not be optimal, however, in a multi-band multi-carrier system, as the antenna apparatus's response for each carrier frequency of interest can vary significantly across different radio frequency bands. Therefore, a dynamic antenna tuning method is proposed for multi-band multi-carrier systems in order to provide optimal performance across the multiple radio frequency bands, which can change based on carrier frequencies in use and/or based on varying communication channel conditions, while also achieving form factor and cost specifications.

Due to a number of constraints including a form factor for the UE, some antenna apparatus in the UE can only partially support multi-band multi-carrier systems. The main issues can be summarized as follows:

Some antenna tuning designs can predetermine an antenna tuning configuration in the laboratory but may not be adaptable to multi-band multi-carrier environments.

Some predetermined antenna tuning designs may not be scalable with respect to multi-band multi-carrier combinations. When the number of multi-band multi-carrier combinations increases, existing schemes can require additional configurations to be predetermined in the laboratory. This procedure may not be efficient for antenna design and development.

Some predetermined antenna tuning designs do not consider "radio" conditions, e.g., communication channel characteristics for wireless communication channel(s) between the UE and the wireless network. Thus, the design may not perform well in a dynamically varying communication channel environment. For example, assume a first carrier frequency $f_1$ has very good signal strength, and a second carrier frequency $f_2$ has very poor signal strength. Intuitively, if the UE ignores the signal strengths of the carrier frequencies and uses a predetermined value for tuning the antenna apparatus, the overall system performance can be compromised. If, however, the UE tunes the antenna circuitry to adjust for the poor signal strength of the second carrier frequency $f_2$, the performance impact on the first carrier frequency $f_1$ can be very small, while the gain for the second carrier frequency $f_2$ may be significant. Therefore, optimizing the performance for one or more carrier frequencies having the "poorest" signal strengths, when tuning the antenna circuitry, may lead to better overall system performance.

Figure 1B:
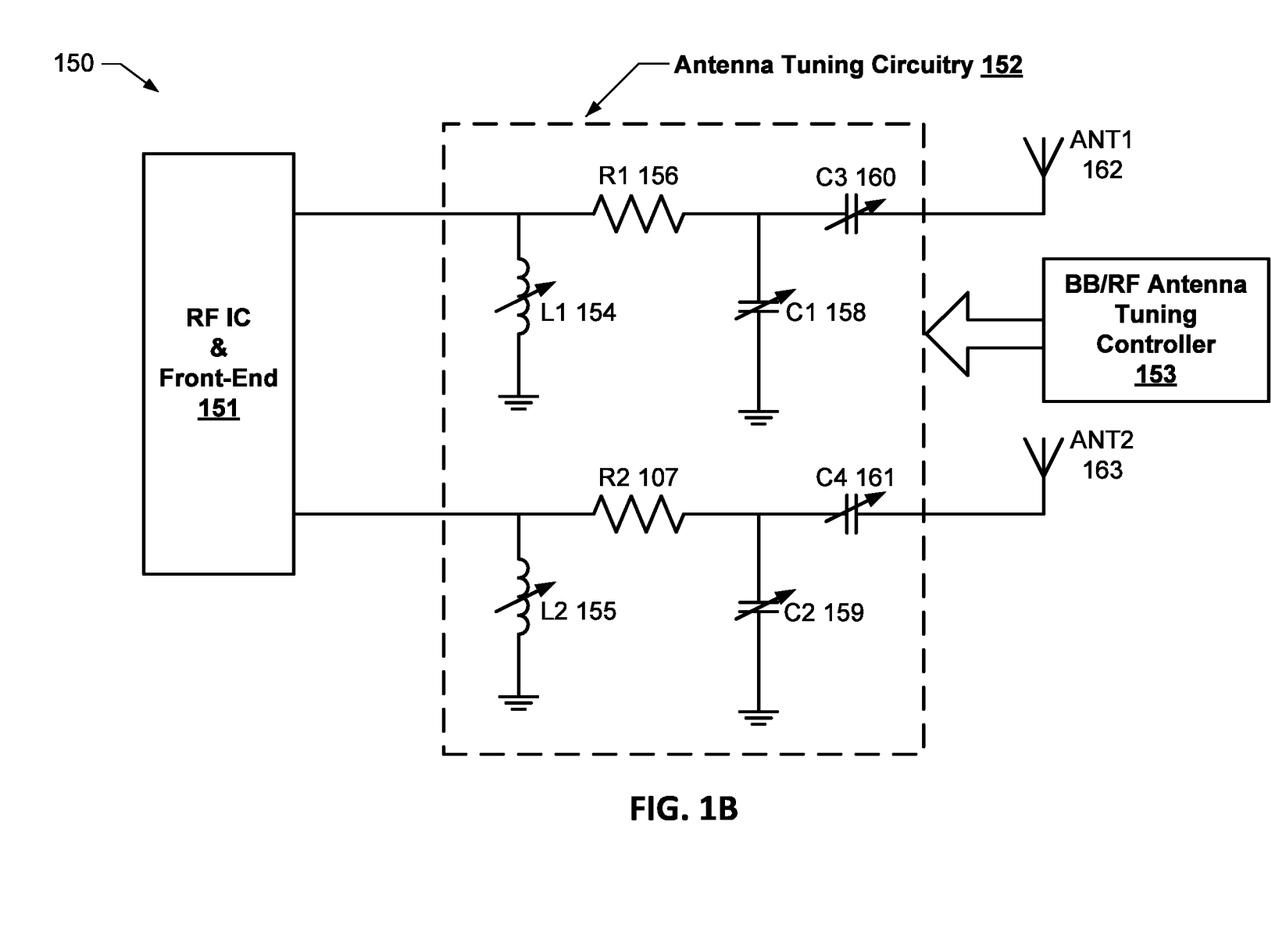
FIG. 1B illustrates a schematic diagram of a RF circuit including a dynamic tunable antenna apparatus, in accordance with some embodiments.

A method and apparatus to improve performance in a UE by dynamically tuning antenna circuitry can include hardware antenna tuning circuitry, baseband and radio frequency (BB/RF) antenna tuning controller, and a set of physical antennas. The antenna tuning controller of the BB/RF can adjust the hardware antenna tuning circuitry dynamically during run time (e.g., for a future time period) for operation in a multi-band multi-carrier and/or a single frequency carrier wireless system. FIG. 1B illustrates a representative embodiment of an antenna apparatus for dynamic antenna tuning.

Figure 2:
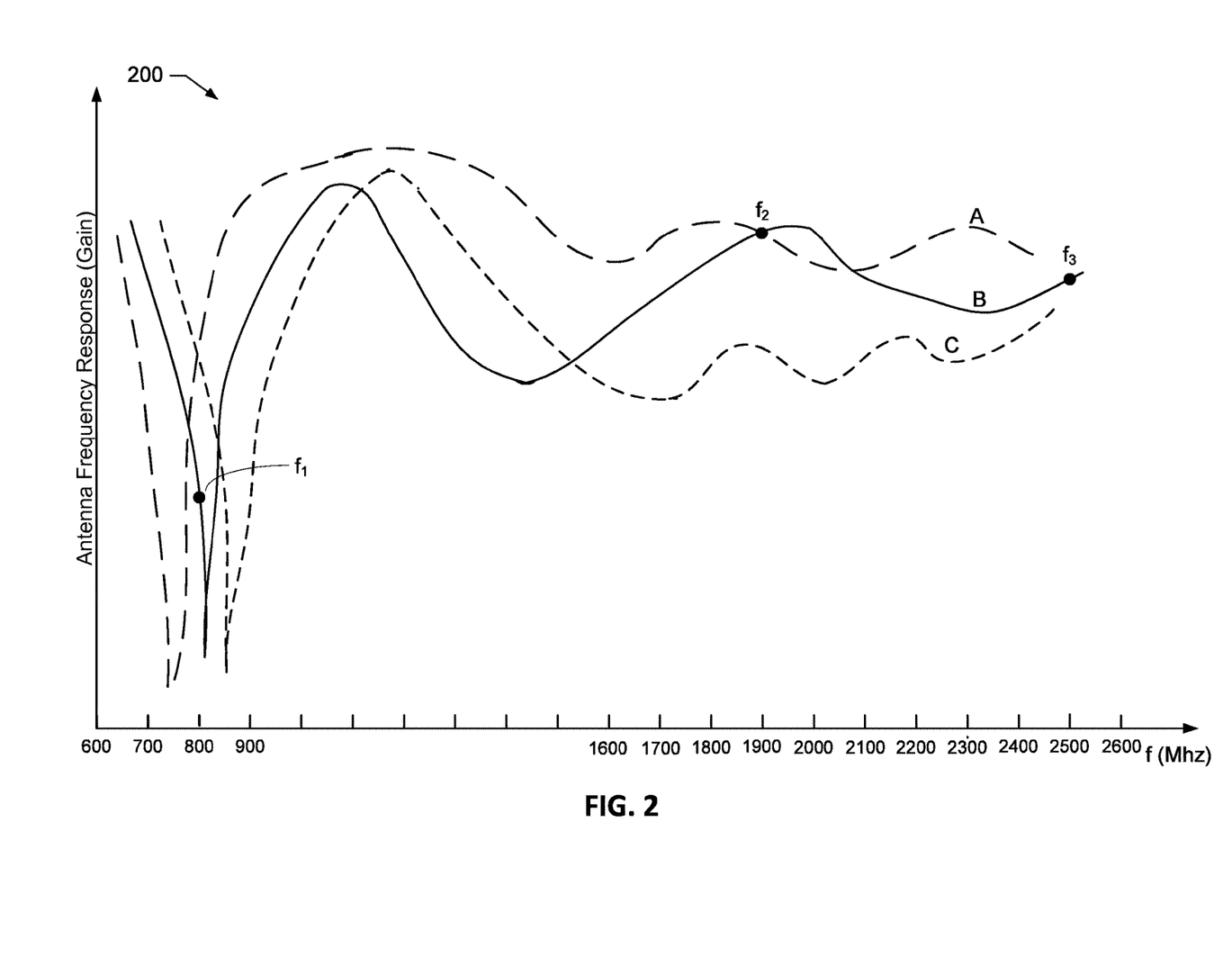
FIG. 2 illustrates an antenna frequency response, in accordance with some embodiments.

Some antenna apparatus and/or a set of physical antennas used in an antenna apparatus may only partially support a set of radio frequency bands that can be required to be covered. FIG. 2 illustrates a range of radio frequencies of interest, e.g., from 700 MHz to 2600 MHz, and shows that an antenna frequency response (antenna gain) may vary significantly over this radio frequency range for an antenna apparatus. A specific antenna and/or a specific antenna tuning circuitry may not provide coverage for all radio frequency bands of interest. For different tunings of the antenna circuitry, the frequency response of the antenna circuitry can vary. For example, antenna tuning configurations A, B, and C result in different antenna frequency responses across the range of radio frequencies illustrated. An objective of embodiments of this disclosure is to tune dynamically the antenna circuitry to provide optimal performance for operation in multiple radio frequency bands.

A method for providing optimal tuning of antenna circuitry starts with a characterization of the frequency response of a multiple number of antenna tuning configurations. An antenna tuning configuration can represent a state for a set of antennas, and each antenna tuning configuration can be considered a fixed antenna apparatus design. On start-up (e.g., boot-up) and/or upon waking from a sleep mode, a set of antenna tuning configuration information can be loaded to an active memory in the mobile device (e.g., the UE). The mobile device can collect receiver and/or transmitter configuration information for a set of active radio frequencies and information about communication channel conditions for current uplink and/or current downlink communication channels. The mobile device can subsequently mathematically combine the communication channel information and the receiver/transmitter configuration information with the set of antenna tuning configuration information to select an optimal antenna tuning configuration. The antenna tuning controller of the BB/RF SW can adjust the antenna tuning hardware dynamically during run time (e.g., while the UE is operational) to implement the optimal antenna tuning configuration.

These and other embodiments are discussed below with reference to FIGS. 1A, 1B, 2, 3, 4, and 5. However, those skilled in the art will readily appreciate that the detailed description given herein with respect to these Figures is for explanatory purposes only and should not be construed as limiting.

FIG. 1A illustrates a representative Long Term Evolution (LTE) wireless network 100, e.g., as specified by 3GPP, that can include user equipment (UE) 102 connected by one or more radio links 126 to one or more radio sectors 104 provided by an evolved radio access network 122. Each radio sector 104 can represent a geographic area of radio coverage emanating from an associated evolved Node B (eNodeB) 110 using a radio frequency channel operating at a selected frequency. In some embodiments, radio sectors 104 can also be referred to as cells. Each eNodeB 110 can generate one or more radio sectors 104 to which the UE 102 can connect by one or more radio links 126. In some wireless networks 100, the UE 102 can be connected to two or more radio sectors 104 simultaneously. The multiple radio sectors 104 to which the UE 102 can be connected can emanate from a single eNodeB 110 or from separate eNodeB's 110. A group of eNodeBs 110 can be referred to as an evolved Universal Mobile Telecommunications System (UMTS) radio access network (eUTRAN) 106. Typically each eNodeB 110 in an eUTRAN 106 can include a set of radio frequency transmitting and receiving equipment mounted on an antenna tower and a radio controller for controlling and processing transmitted and received radio frequency signals. The eNodeB 110 of the eUTRAN 106 can manage the establishment, maintenance and release of the radio links 126 that connect the UE 102 to an evolved radio access network 122. In some embodiments, the eNodeB 110 can provide access to a wireless network based on an LTE technology, such as an LTE wireless network 100 and/or LTE-Advanced (LTE-A) wireless network. It will be appreciated, however, that various example embodiments are not limited to application in LTE wireless network 100.

Radio resources that form the radio links 126 in the radio sectors 104 can be shared among multiple UEs 102 using a number of different multiplexing techniques, including time division, frequency division, code division, space division and combinations thereof. A radio resource control (RRC) signaling connection can be used to communicate between the UE 102 and the eNodeB 110 in the eUTRAN 106 of the evolved radio access network 122 including requests for and dynamic allocations of radio resources to multiple UEs 102. The UE 102 can be connected to the evolved radio access network 128 through one or more radio sectors 104 simultaneously.

The evolved radio access network 122, which provides radio frequency air link connections to the UE 102, connects also to an evolved packet core network 120. The LTE wireless network 100 can be designed to operate as a packet switched network exclusively. The evolved packet core network 120 can include serving gateways 112 that interconnect the evolved radio access network 122 to public data network (PDN) gateways 116 that connect to external internet protocol (IP) networks 118. The eNodeB's 110 can also be connected to a mobility management entity (MME) 114 that can provide control over connections for the user equipment 102. The eNodeB 110 can control allocation of radio resources for the radio links 126 to the user equipment 102. The eNodeB 110 can communicate paging messages to the user equipment 102, including paging messages to establish an RRC connection with the user equipment 102 and transition from an RRC idle state to an RRC connected state. The eNodeB 110 can schedule radio resources for the UE 102 and provide indications of radio resource allocations using signaling messages communicated in a physical downlink control channel (PDCCH). The UE 102 can monitor the PDCCH to determine when radio resources are assigned to the particular UE 102 for downlink transmission from the eNodeB 110 or for uplink transmission to the eNodeB 110. The eNodeB 110 can also broadcast system information block (SIB) messages periodically to inform the UE 102 about properties of the radio sectors 104 and/or for services provided by the eNodeB 110.

As previously noted, radio resources that form the radio links 126 in the radio sectors 104 can be shared among multiple UEs 102 using a number of different multiplexing techniques, including time division, frequency division, code division, space division and combinations thereof. This multiplexing presents a significant challenge to tune antennas in a multi-band multi-carrier frequency environment. The transmitters and the receivers located at UE 102 and at the eNodeB's 110 of the radio sector 104 must perform their functions for multiple carrier frequencies in multiple frequency bands. The 3GPP has specified operation in 25 different radio frequency bands for frequency division duplex (FDD) systems and 11 different radio frequency bands for time division duplex (TDD) systems. These radio frequency bands span a range of radio frequencies from 704 MHz to 3800 MHz.

Moreover, LTE-Advanced introduces a peak data rate requirement of 3 Gbps in the downlink and 1.5 Mbps in the uplink. This requirement can be achieved by increasing the channel bandwidth with a technology called carrier aggregation (CA). Carrier aggregation increases the channel bandwidth by combining multiple RF carriers. Application data can then be transmitted and received using multiple RF carriers rather than a single carrier. Each individual RF carrier can be referred to as a component carrier (CC). Carrier aggregation can be applicable to uplink and downlink directions. A component carrier can be either an uplink communication or a downlink communication, or a downlink communication only. Also, user equipment can provide carrier aggregation independently for receiving and transmitting. That is, one user equipment can provide carrier aggregation in the downlink direction only, while another user equipment can provide carrier aggregation in both the uplink direction and the downlink direction. Carrier aggregation can be used for both frequency division duplex (FDD) systems and for time division duplex (TDD) systems.

Carrier aggregation in LTE Advanced can be implemented with a number of component carriers, for example between two and five component carriers. In general, each component carrier can use a different radio frequency channel bandwidth. An LTE channel bandwidth can range in width from 1.4 MHz to 20 MHz. When the number of carrier components is five, and the bandwidth of each component carrier is 20 MHz, then the aggregate channel bandwidth can span 100 MHz. Hence, a UE 102 can be configured to transmit to (and receive from) the radio sector 104 with a channel bandwidth as wide as 100 MHz.

In addition, 3GPP defines three general types of carrier aggregation scenarios: intra-band contiguous, intra-band non-contiguous and inter-band non-contiguous. In the case of intra-band carrier aggregation, the component carriers are located within an individual frequency band and can be contiguous or non-contiguous. The contiguous scenario means the component carriers are immediately next to one another. The non-contiguous scenario means there can be another channel bandwidth located in between the component carriers, for example, a bandwidth of 1.4 MHz to 20 MHz. In the case of the inter-band non-contiguous scenario, the component carriers are located in different frequency bands.

In the LTE multi-band environment and especially with carrier aggregation, one skilled in the art can recognize the challenge to design an antenna for UE 102 that can be flexible and cost effective while also achieving good performance under a number of different configurations. One solution is to dynamically tune the antenna in order to adjust to the continual changes in the carrier frequencies and carrier bandwidths.

FIG. 1B illustrates radio frequency (RF) circuit 150. RF circuit 150 can include wireless circuitry, which can include an RF integrated circuit (IC), such as a baseband processor, and a set of wireless front-end (FE) circuitry 151. The RF IC and FE 151 can be coupled to a set of dynamically tunable antenna tuning circuitry 152, which in turn can be coupled to a hardware/software module to provide baseband radio frequency (BB/RF) antenna tuning controller 153. The antenna tuning circuitry 152 can be coupled to a set of antennas, e.g., physical antennas ANT1 162 and ANT2 163. The antenna tuning circuitry 152 can include multiple passive components, at least some of which can be "tunable," i.e., adjustable to different values. As illustrated in FIG. 1B, the antenna tuning circuitry 152 can include at least the following components: inductors L1 154, L2 155; resistors, R1 156, R2 157; capacitors C1 158, C2 159, C3 160, and C4 161. The aforementioned describes a set of hardware components. As illustrated, in some embodiments, the inductors and capacitors of the antenna tuning circuitry 152 can be dynamically adjustable.

As shown in FIG. 1B, BB/RF antenna tuning controller 153 can provide inputs to the antenna tuning circuitry 152. Based on those inputs, values for inductors L1 154, L2 155 and capacitors C1 158, C2 159, C3 160, and C4 161 can be determined. The values used for these tunable components, along with values for the resistors, R1 156, R2 157, and characteristics of the physical antennas ANT1 162, ANT2 163, can determine the overall characteristics of the dynamically tuned antenna apparatus for the RF circuit 150. The antenna tuning circuitry 152 illustrates a representative embodiment, and additional embodiments using fewer or more tunable components and/or fixed components can also be considered.

FIG. 2 illustrates an antenna frequency response (or antenna gain) 200 for a set of different antenna states A, B, C, which can correspond to different configurations for an antenna apparatus. An antenna state can be associated with an antenna tuning configuration. As illustrated in FIG. 2, antenna tuning configuration B includes different antenna gain values at different radio frequencies in different radio frequency bands. For example:

In the 800 MHz radio frequency band, antenna state B has an antenna frequency response $f_1$;
In the 1900 MHz radio frequency band, antenna state B has an antenna frequency response $f_2$; and
In the 2500 MHz radio frequency band, antenna state B has an antenna frequency response $f_3$.

The aforementioned radio frequency bands are an example of different radio frequency bands that can be used by a wireless network operator to provide a 4G wireless service. For some 4G wireless services, the wireless network operator can require a UE 102 to be able to simultaneously access and tune the UE's antenna apparatus to support these different radio frequency bands. Per FIG. 2, antenna state B provides a poor antenna frequency response in the 800 MHz radio frequency band. In comparison, for antenna state B, the antenna frequency response (gain) is significantly higher in the 1900 MHz and 2500 MHz radio frequency bands. FIG. 2 also illustrates two other antenna states, A and C. One skilled in the art will note that the antenna frequency response between antenna states A, B and C are considerably different. However, there are a few radio frequency values at which the antenna frequency response is the same for each antenna state. For example, state A and state B have approximately equivalent antenna frequency response values near 1900 MHz.

Figure 3:
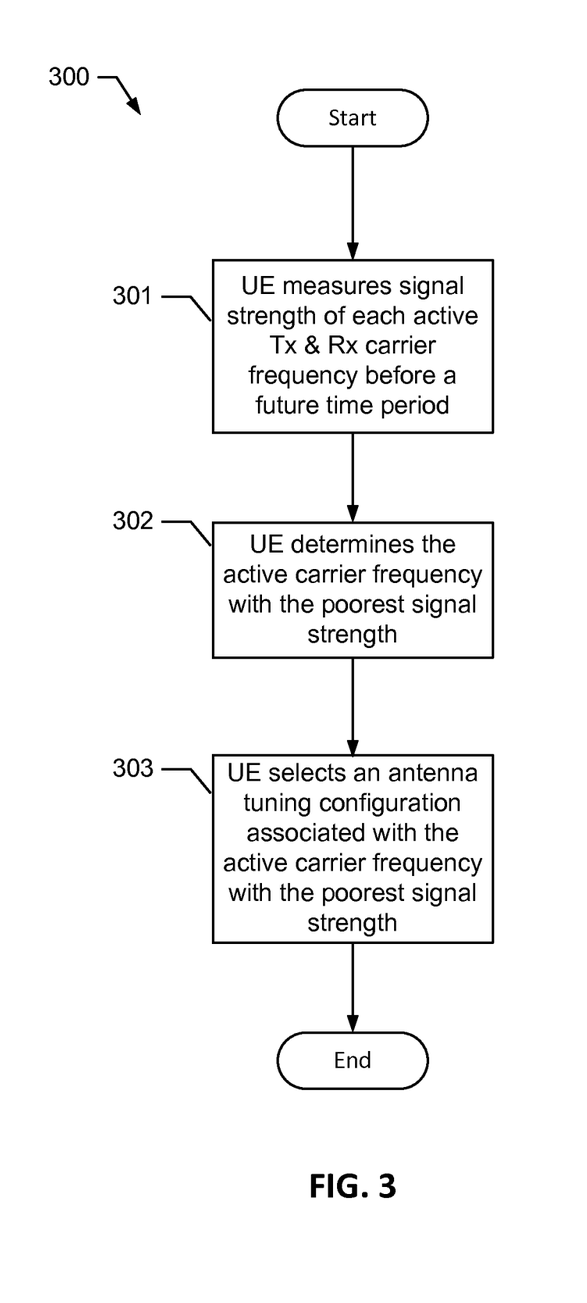
FIG. 3 illustrates a flowchart depicting a procedure for dynamically tuning the UE antenna, in accordance with some embodiments.

FIG. 3 illustrates a flowchart 300 depicting a procedure for dynamically tuning antenna circuitry in a UE 102 in a multiple radio frequency band (multi-band) multi-carrier environment. The method includes measuring a signal strength of a carrier frequency for two or more active (transmit and/or receive) carrier frequencies for a future time period, which can be the next time slot; determining which of the two or more active carrier frequencies measures the poorest signal strength; and dynamically tuning the antenna apparatus to optimize the antenna frequency response (and therefore the signal strength after the optimization) for the active carrier frequency that measured the poorest signal strength. In some embodiments, the future time period represents a next or subsequent time period during which transmissions and/or reception of radio frequency signals may occur.

Per flowchart 300, in a first step of the method, step 301, the signal strength of each of the active receive carrier frequencies and/or each of the active transmit carrier frequencies can be measured during run time and before a future time period. In a second step, step 302, based on data obtained in step 301, an active carrier frequency with the poorest signal strength is determined. In a third step, step 303, an antenna tuning configuration associated with the active carrier frequency determined to have the poorest signal strength is selected. With this method, the active carrier frequency with the poorest measured signal strength can be improved by selecting the antenna tuning configuration in use to compensate, at least in part, for the poor signal strength of the "poorest" active carrier frequency. Moreover, with the selected antenna tuning configuration, the active carrier frequencies that have stronger measured signal strengths may be not significantly impacted by the selected antenna tuning configuration. Hence, the antenna apparatus may provide a better overall performance. The steps 301, 302 and 303 can be repeated for each future time period.

Figure 4:
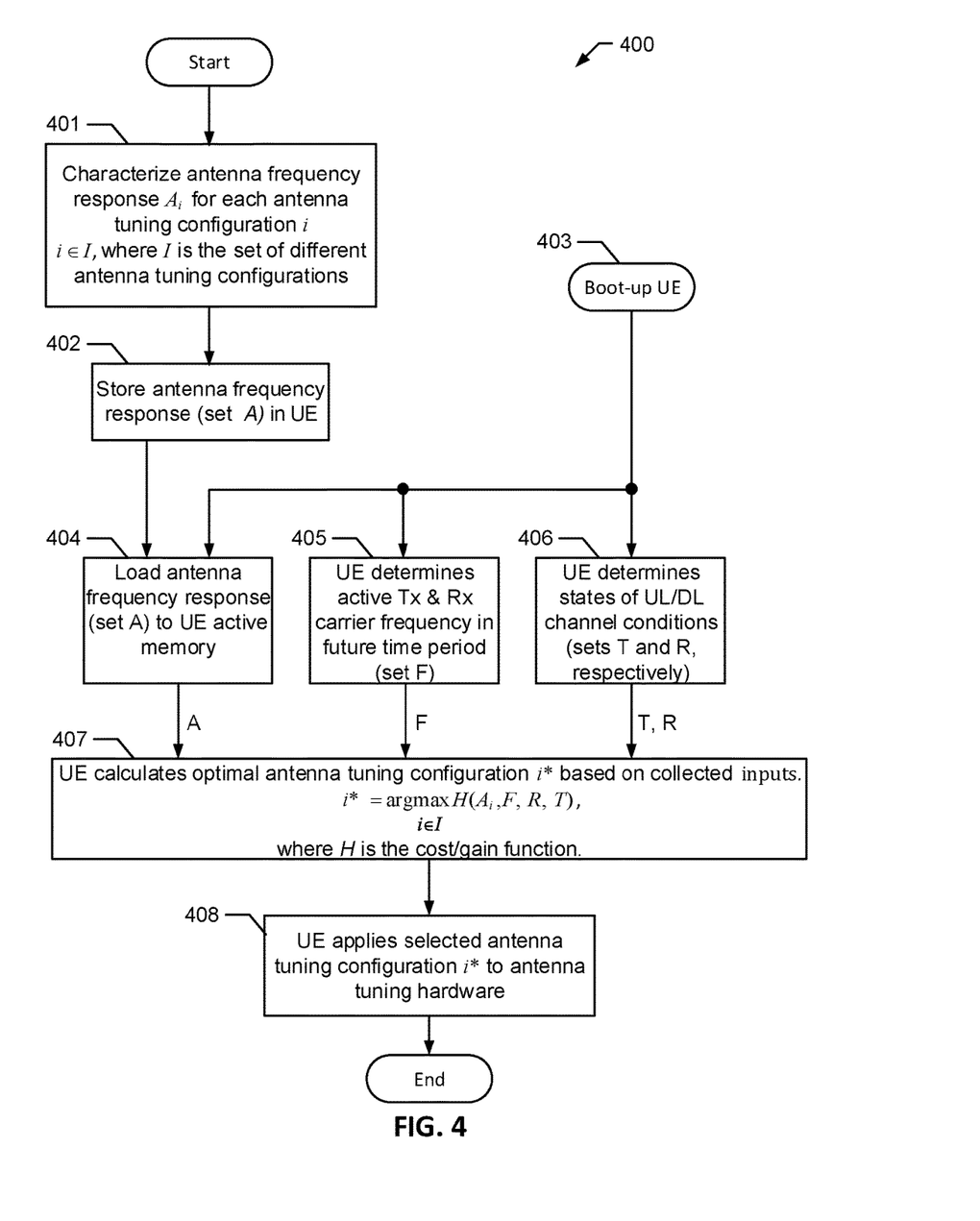
FIG. 4 illustrates a flowchart depicting another procedure for dynamically tuning the UE antenna, in accordance with some embodiments.

FIG. 4 illustrates a flowchart 400 depicting a procedure for dynamically tuning an antenna circuitry of the UE 102 while operating in a multi-band environment. The steps to select the optimal antenna tuning configuration can at least include the following:

1. Characterize an antenna frequency response for each antenna tuning configuration, e.g., in the laboratory (step 401), and store the antenna frequency response information in UE 102 (step 402). Let $A_i$ denote an antenna frequency response associated with an antenna tuning configuration i, i∈I, where I represents a set of different antenna tuning configurations.

Figure 5:
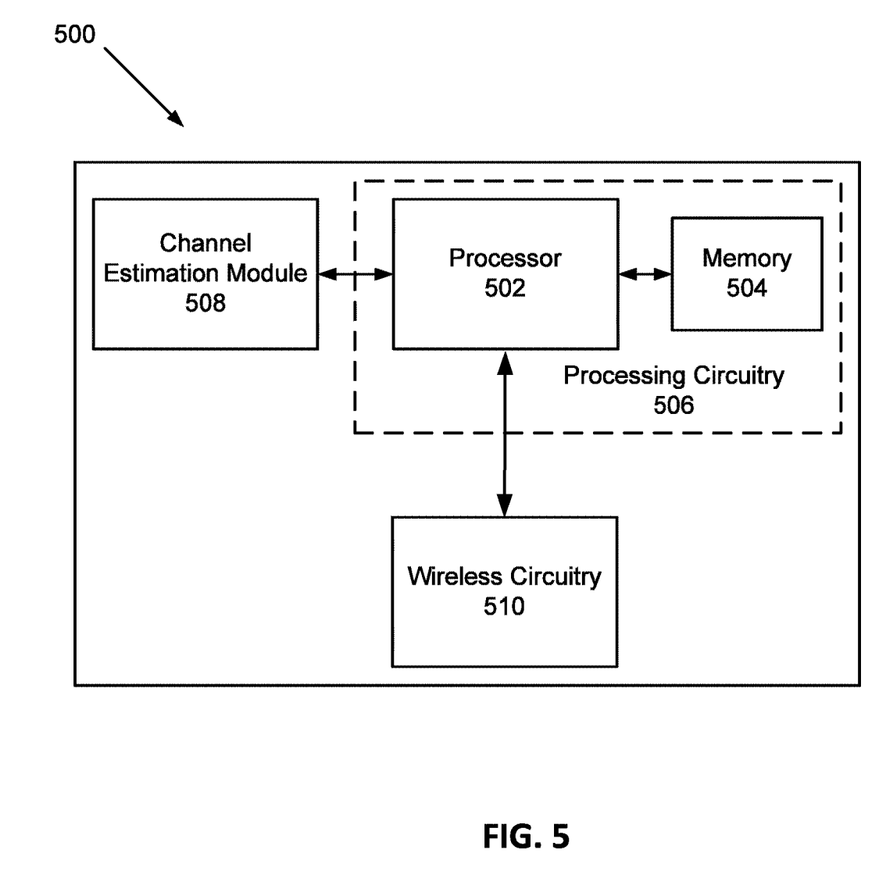
FIG. 5 illustrates a block diagram of an apparatus that can be implemented on a wireless communication device in accordance with some embodiments.

2. During a boot up of wireless circuitry of the UE 102, e.g., a baseband processor and/or other wireless processing circuitry 506, (step 403), the UE 102 loads the antenna frequency response information to UE 102 memory 504 (step 404), and uses the antenna frequency response information as an input to an antenna tuning control module (e.g., the BB/RF antenna tuning controller 153 illustrated in FIG. 1B).

3. During normal operation, the UE 102 determines a set of transmit (Tx) and/or receive (Rx) frequencies that can be active during a future (e.g. next) time period (step 405). The set of transmit (Tx) and/or receive (Rx) frequencies can be a set of carrier frequencies. Let F denote the set of active Tx/Rx carrier frequencies.

4. The UE 102 determines a set of states for the UL/DL communication channel conditions, e.g., information based on past, recent, and/or current communication channel conditions (step 406). Let T and R denote the set of UL/DL communication channel conditions, respectively.

5. The UE 102 determines an optimal antenna tuning configuration i*, based on collected inputs (step 407).

$$i^* = \operatorname{argmax}_{i \in I} H(A_i, F, R, T) \quad (1)$$

H represents a cost/gain function; $\{A_i\}$ represents the set of antenna frequency responses for the set of antenna tuning configurations I, where i represents a particular antenna tuning configuration i, i∈I; F represents the set of active Tx/Rx frequencies; while T and R represent the set of UL communication channel conditions and DL communication channel conditions, respectively.

Using calculations of the cost/gain function of Equation (1), the optimal antenna tuning configuration i* can be determined.

6. The UE 102 applies the selected antenna tuning configuration i* to antenna tuning hardware (step 408).

The time for the antenna apparatus to configure and optimize the tuning of the antenna circuitry for a future time period can be defined as the time to execute steps 404, 405, 406, 407 and 408. An execution time to configure and optimize the tuning of the antenna circuitry can be less than 1 millisecond, in some embodiments. The steps 404, 405, 406, 407 and 408 can be repeated for each future time period.

In antenna design, the characteristics of an antenna can be determined by a cost function. The cost function associated with the specific antenna of interest is what quantifies improvement and optimization. By varying the parameters of the cost function, the performance of the antenna can be adjusted; hence an optimal antenna tuning configuration can be determined. As noted in Equation (1), the cost/gain function can be determined by parameters of the antenna frequency response for a set of two or more antenna tuning configurations $\{A_i\}$, a set of active transmit frequencies and/or receive frequencies $\{F\}$, and the set of states that characterize current communication channel conditions for the uplink and downlink communication channels $\{R, T\}$. The optimal antenna tuning configuration can be determined based on determining a value for i that maximizes the cost/gain function, e.g., an argument of the maximum (argmax) of the cost/gain function shown in Equation (1).

Methods to determine the optimal antenna tuning configuration can be implemented with different optimization criteria. That is, based on a design goal, one can use different cost/gain functions. Different design goals can be used; such as accommodating different combinations of receive carrier frequencies and transmit carrier frequencies. For example, a UE 102 may need to support three distinct radio frequency bands: one radio frequency band can include both Tx and Rx carrier frequencies, while the other two radio frequency bands can include only Rx carrier frequencies. The combination of one or more active receive carrier frequencies and one or more active transmit carrier frequencies can be determined before each future time period.

Assume the carrier frequencies for these radio frequency bands are denoted as $f_{1,t}$, $f_{1,r}$, $f_{2,r}$, $f_{3,r}$, (where the subscript "t" or "r" indicates a transmit carrier frequency or a receive carrier frequency respectively) and their corresponding antenna gains for an antenna tuning configuration i, i∈I, as $a_{i,1t}$, $a_{i,1r}$, $a_{i,2r}$, $a_{i,3r}$. Assume the receive sensitivity and a current value for a received signal strength indicator (RSSI) for these carrier frequencies are represented by $(R_1, RSSI_1)$, $(R_2, RSSI_2)$, and $(R_3, RSSI_3)$; a maximum transmit power level and a current Tx power level are represented by $(T_{max1}, T_1)$; and an antenna coefficient is represented by $a_i$. One can define a cost function for the antenna tuning configuration i, i∈I, as $$H_i = a_{i,1t}(T_1 - T_{max1}) + a_{i,1r}(RSSI_1 - R_1) + a_{i,2r}(RSSI_2 - R_2) + a_{i,3r}(RSSI_3 - R_3). \quad (2)$$

As illustrated by Equation (2), a cost/gain function for a particular antenna state can be a function of the transmission power levels and the receive signal strengths. For higher transmission power values and for lower receive signal strengths, the cost/gain function can increase in value. Thus, a method to balance an antenna tuning between "better" carrier frequencies and "poorer" carrier frequencies can improve performance of the antenna apparatus. In some embodiments, the method can set weight factors to emphasize a set of critical signal conditions. For example, if the receive signal strength and/or the transmission power values are poor different gains in different antenna tuning configuration can be utilized to impact performance.

The aforementioned dynamic antenna tuning method can provide the following benefits for user equipment operating in a wireless network:

The method can determine an optimal antenna tuning configuration during run time (e.g., for a particular current and/or future time period) that is "tuned" for a multi-band multi-carrier system. The method additionally provides for dynamic antenna tuning operation of the user equipment in a single frequency carrier system.

The method can accommodate a number of different multi-band multi-carrier combinations. The complexity of the dynamic antenna tuning method is minimally impacted by a change in the number of radio frequency carriers used, and different combinations of radio frequency carriers can be accommodated by the dynamic antenna tuning method. The multi-band multi-carrier system can include different combinations of receive radio frequency carriers and transmit radio frequency carriers.

The method can analyze the uplink and downlink radio communication channel conditions to ascertain information to support determining the optimal antenna tuning configuration and thus can enhance the overall performance of the user equipment in a wireless network.

The dynamic antenna tuning method can analyze receive carrier frequencies Rx and/or transmit carrier frequencies Tx separately in order to determine the optimal antenna tuning configuration. Accordingly, the dynamic antenna tuning method can optimize the performance of the UE based on a set of current, recent past, and/or predicted future transmit and/or receive communication channel conditions.

In FIG. 2, the BB/RF antenna tuning controller 153 provides input parameters to the antenna tuning circuitry 152, in order to dynamically tune the antenna apparatus. In one embodiment, BB/RF antenna tuning controller 153 calculates the optimal antenna tuning configuration based on the flowchart 400 of FIG. 4 and equation (1). In another embodiment, BB/RF antenna tuning controller 153 calculates the optimal antenna tuning configuration based on the flowchart 300 of FIG. 3.

FIG. 5 illustrates a block diagram of an apparatus 500 that can be a portion of UE 102, in accordance with some embodiments. The apparatus of FIG. 5 can be configured to perform dynamic antenna tuning in accordance with one or more embodiments. It will be appreciated that the components, devices or elements illustrated in and described with respect to FIG. 5 may not be mandatory and thus some may be omitted in certain embodiments. Additionally, some embodiments can include further or different components, devices or elements beyond those illustrated in and described with respect to FIG. 5.

In some example embodiments, the apparatus 500 can include processing circuitry 506 that is configurable to perform actions in accordance with one or more embodiments disclosed herein. In this regard, the processing circuitry 506 can be configured to perform and/or control performance of one or more functionalities of the apparatus 500 in accordance with various embodiments, and thus can provide means for performing functionalities of the apparatus 500 in accordance with various embodiments. The processing circuitry 506 can be configured to perform data processing, application execution and/or other processing and management services according to one or more embodiments.

In some embodiments, the apparatus 500 or a portion(s) or component(s) thereof, such as the processing circuitry 506, can include one or more chipsets, which can each include one or more chips. The processing circuitry 506 and/or one or more further components of the apparatus 500 can therefore, in some instances, be configured to implement an embodiment on a chipset comprising one or more chips. In some example embodiments in which one or more components of the apparatus 500 are embodied as a chipset, the chipset can be capable of enabling a computing device, e.g., UE 102, to operate in the wireless network 100 when implemented on or otherwise operably coupled to the computing device, e.g., UE 102. Thus, for example, one or more components of the apparatus 500 can provide a chipset configured to enable a computing device to communicate using one or more cellular wireless technologies. In some embodiments, the processing circuitry 506 can include a processor 502 and, in some embodiments, such as that illustrated in FIG. 5, can further include memory 504. The processing circuitry 506 can be in communication with or otherwise control wireless circuitry 510 and/or a channel estimation module 508.

The processor 502 can be embodied in a variety of forms. For example, the processor 502 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 502 can comprise a plurality of processors. The plurality of processors can be in operative communication with each other and can be collectively configured to perform one or more functionalities of the apparatus 500 as described herein. In some embodiments, the processor 502 can be configured to execute instructions that can be stored in the memory 504 or that can be otherwise accessible to the processor 502. As such, whether configured by hardware or by a combination of hardware and software, the processor 502 can be capable of performing operations according to various embodiments while configured accordingly.

In some embodiments, the memory 504 can include one or more memory devices. Memory 504 can include fixed and/or removable memory devices. In some embodiments, the memory 504 can provide a non-transitory computer-readable storage medium that can store computer program instructions that can be executed by the processor 502. In this regard, the memory 504 can be configured to store information, data, applications, instructions and/or the like for enabling the apparatus 500 to carry out various functions in accordance with one or more example embodiments. In some embodiments, the memory 504 can be in communication with one or more of the processor 502, wireless circuitry 510, or channel estimation module 508 via one or more busses for passing information among components of the apparatus 500.

The apparatus 500 can further include wireless circuitry 510. The wireless circuitry 510 can be configured to enable the apparatus 500 to send wireless signals to and receive signals in accordance with one or more wireless networking technologies. As such, the wireless circuitry 510 can enable the apparatus 500 to send signals to and receive signals from an eNodeB 110 (or an equivalent) of a wireless network. In some embodiments, the wireless circuitry 510 includes hardware and/or software modules to perform operations to convert digital data to and/or from analog wireless radio frequency waveforms.

The apparatus 500 can further include channel estimation module 508. The channel estimation module 508 can be embodied as various means, such as circuitry, hardware, a computer program product comprising computer readable program instructions stored on a computer readable medium (for example, the memory 504) and executed by a processing device (for example, the processor 502), or some combination thereof. In some embodiments, the processor 502 (or the processing circuitry 506) can include, or otherwise control the channel estimation module 508. The channel estimation module 508 can be configured to perform and/or otherwise control channel estimation in accordance with one or more embodiments disclosed herein.

RF circuit 150 of FIG. 1B can be a portion of apparatus 500. (Apparatus 500 can be a portion of UE 102.) The BB/RF antenna tuning controller 153 can be a portion of processing circuitry 506 and a portion of the channel estimation module 508. The BB/RF antenna tuning controller 153 can be a portion of processor 502 and a portion of memory 504. Similarly, the antenna tuning circuitry 152, the physical antennas ANT1 162 and ANT2 163, and the RF IC and Front End 151 can be a portion of wireless circuitry 510.

In summary, a method for dynamically tuning antenna circuitry of a user equipment (UE 102) in a multi-band multi-carrier wireless system includes the UE 102 loading antenna frequency response information for two or more antenna tuning configurations to a UE memory 504; determining a set of active receive carrier frequencies and active transmit carrier frequencies for a future time period; determining a set of states characterizing current uplink communication channel conditions and current downlink communication channel conditions; determining an optimal antenna tuning configuration based on the set of active receive carrier frequencies and transmit carrier frequencies for the future time period and the set of states characterizing the current uplink communication channel conditions and the current downlink communication channel conditions; and tuning dynamically the antenna circuitry of the UE 102 to the optimal antenna tuning configuration for the future time period.

The method also includes determining the optimal antenna tuning configuration which includes calculating an argument of a maximum (argmax) of a cost/gain function. The cost/gain function is calculated based on antenna frequency response information for each of two or more antenna tuning configurations; the set of active receive carrier frequencies and transmit carrier frequencies for the future time period; and the set of states characterizing the current uplink communication channel conditions and the current downlink communication channel conditions. The set of active receive carrier frequencies and active transmit carrier frequencies includes a combination of one or more active receive carrier frequencies and/or one or more active transmit carrier frequencies, wherein the combination of the one or more active receive carrier frequencies and/or the one or more active transmit carrier frequencies are determined for a future time period.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An apparatus for dynamically tuning antenna circuitry of a user equipment (UE) in a multi-band multi-carrier wireless system, the apparatus comprising:
   antenna tuning circuitry, the antenna tuning circuitry coupled between a front-end of a transceiver and one or more physical antennas, wherein the antenna tuning circuitry comprises a plurality of adjustable hardware components; and
   an antenna tuning controller comprising:
      a processor, and
      a memory comprising instructions that when executed by the processor cause the antenna tuning controller to:
         determine, for a future time period, an active transmit carrier frequency, and
         tune the one or more physical antennas for the future time period with respect to: i) a first receive component carrier (CC) ii) a second receive CC, and iii) a transmit CC,
      wherein: i) the antenna tuning controller is coupled to the antenna tuning circuitry, ii) the antenna tuning controller tunes the one or more physical antennas by determining values for the plurality of adjustable hardware components, iii) the transmit CC corresponds to the active transmit carrier frequency, iv) the first receive CC is in a first band, v) the second CC is in a second band, and vi) the first band and the second band are associated with a carrier aggregation (CA) protocol, and wherein the antenna tuning controller calculates an argument to determine values of the plurality of adjustable hardware components based at least in part on: i) a first received signal strength indication (RSSI) associated with the first receive CC and ii) a second RSSI associated with the second receive CC.

2. The apparatus as recited in claim 1, wherein the argument is associated with a cost/gain function.

3. The apparatus as recited in claim 2, wherein the argument comprises:
antenna frequency response information for two or more antenna tuning configurations of the one or more physical antennas; and
a set of states characterizing current uplink communication channel conditions.

4. The apparatus of claim 1, wherein the argument is based at least in part on a transmit power of the transmit CC.

5. The apparatus as recited in claim 1, wherein the plurality of adjustable hardware components comprises adjustable capacitors and adjustable inductors.

6. The apparatus as recited in claim 1, wherein an execution time to configure and optimize tuning of the one or more physical antennas is less than 1 millisecond.

7. The apparatus as recited in claim 1, wherein the UE is configured to use a set of carrier frequencies that comprises a combination of one or more active receive carrier frequencies and one or more active transmit carrier frequencies.

8. The apparatus of claim 1, wherein the one or more physical antennas comprises at least two physical antennas.

9. The apparatus of claim 1, wherein: i) the first band is an 800 MHz band, and ii) the second band is a 1900 MHz band or a 2500 MHz band.

10. A method for dynamically tuning antenna circuitry of a user equipment (UE) in a multi-band multi-carrier wireless system, wherein: i) the UE comprises antenna tuning circuitry, ii) the antenna tuning circuitry coupled between a front-end of a transceiver and one or more physical antennas, and iii) the antenna tuning circuitry comprises a plurality of adjustable hardware components, the method comprising:
at an antenna tuning controller:
determining, for a future time period, an active transmit carrier frequency, and
tuning the one or more physical antennas for the future time period with respect to: i) a first receive component carrier (CC) ii) a second receive CC, and iii) a transmit CC, wherein the tuning comprises calculating an argument to determine values of the plurality of adjustable hardware components based at least in part on: i) a first received signal strength indication (RSSI) associated with the first receive CC and ii) a second RSSI associated with the second receive CC,
wherein: i) the antenna tuning controller is coupled to the antenna tuning circuitry, ii) the antenna tuning controller tunes the one or more physical antennas by determining values for a plurality of adjustable hardware components, iii) the transmit CC corresponds to the active transmit carrier frequency, iv) the first receive CC is in a first band, v) the second CC is in a second band, and vi) the first band and the second band are associated with a carrier aggregation (CA) protocol.

11. The method of claim 10, wherein: i) the first band is an 800 MHz band, and ii) the second band is a 1900 MHz band or a 2500 MHz band.

12. The method as recited in claim 10, wherein the plurality of adjustable hardware components comprises adjustable capacitors and adjustable inductors.

13. The method as recited in claim 10, wherein an execution time to configure and optimize tuning of the one or more physical antennas is less than 1 millisecond.

14. The method as recited in claim 10, wherein the UE is configured to use a set of carrier frequencies that comprises a combination of one or more active receive carrier frequencies and one or more active transmit carrier frequencies.

15. The method of claim 10, wherein the one or more physical antennas comprises at least two physical antennas.

16. The method as recited in claim 10, wherein the argument is associated with a cost/gain function.

17. The method as recited in claim 16, wherein the argument comprises:
antenna frequency response information for two or more antenna tuning configurations of the one or more physical antennas; and
a set of states characterizing current uplink communication channel conditions.

18. The method of claim 10, wherein the argument is based at least in part on a transmit power of the transmit CC.

19. A non-transitory computer readable medium storing instructions that when executed by a processor in a user equipment (UE) cause an antenna tuning controller in the UE to:
determine, for a future time period, an active transmit carrier frequency, and
tune one or more physical antennas of the UE for the future time period with respect to: i) a first receive component carrier (CC) ii) a second receive CC, and iii) a transmit CC, wherein the instructions cause the UE to tune by calculating an argument to determine values of the plurality of adjustable hardware components based at least in part on: i) a first received signal strength indication (RSSI) associated with the first receive CC and ii) a second RSSI associated with the second receive CC,
wherein: i) the antenna tuning controller is coupled to antenna tuning circuitry, ii) the instructions cause the antenna tuning controller to tune the one or more physical antennas by determining values for a plurality of adjustable hardware components, iii) the transmit CC corresponds to the active transmit carrier frequency, iv) the first receive CC is in a first band, v) the second CC is in a second band, and vi) the first band and the second band are associated with a carrier aggregation (CA) protocol.

20. The non-transitory computer readable medium of claim 19, wherein: i) the first band is an 800 MHz band, and ii) the second band is a 1900 MHz band or a 2500 MHz band.

* * * * *